April 2, 1929.  L. B. SPERRY  1,707,690

AUTOMATIC PILOT FOR AIRPLANES

Original Filed Sept. 13, 1919  3 Sheets-Sheet 1

INVENTOR
LAWRENCE B. SPERRY.
BY
Herbert H. Thompson
ATTORNEY

April 2, 1929.  L. B. SPERRY  1,707,690
AUTOMATIC PILOT FOR AIRPLANES
Original Filed Sept. 13, 1919   3 Sheets-Sheet 3

INVENTOR
LAWRENCE B. SPERRY.
BY
Herbert F. Thompson
his ATTORNEY

Patented Apr. 2, 1929.

1,707,690

UNITED STATES PATENT OFFICE.

LAWRENCE B. SPERRY, OF GARDEN CITY, NEW YORK, ASSIGNOR, BY MESNE ASSIGNMENTS, TO SPERRY GYROSCOPE COMPANY, INC., A CORPORATION OF NEW YORK.

AUTOMATIC PILOT FOR AIRPLANES.

Application filed September 13, 1919, Serial No. 323,464. Renewed December 13, 1928.

This invention relates to the control of airplanes. Heretofore airplanes have been provided with automatic control means and with manual control means connected with the automatic control, so that the automatic piloting means could be adjusted by the aviator to cause the machine to fly in any desired manner. Also it has been customary to provide an independent manual control for use when the automatic pilot was not in use. Such control systems have involved numerous parts and complex connections between the manual adjustment, the automatic control, and the straight manual control. In the simplified control system which I have devised, however, the automatically operated control surfaces can be "over-controlled" at the will of the aviator by the operation of a separate set of control surfaces, and the necessity for adjustments of the automatic pilot rendered unnecessary. To this end I have provided, in addition to the usual control surfaces operable directly by the aviator, a separate auxiliary set of automatically operated control surfaces, the operation of the automatically operated control surfaces having less effect upon the airplane than the operation of the control surfaces which are operated directly by the aviator. In this manner the effect of the automatic control can be modified to such an extent that the movement of the airplane in any plane can be controlled by the operator directly regardless of the action of the automatic control surfaces, but at the same time the advantages of automatic stabilization in all planes retained. A still further improvement in operation is attained, since by employing smaller control planes with the automatic pilot the so called "hunting" action or jerkiness of the control is largely eliminated even through no follow-up system be employed. A simple and reliable control, either manual or automatic, is also secured.

Referring to the drawings in which I have shown what I now consider to be the preferred embodiment of my invention:

An airplane 1, of any suitable construction, is shown provided with a set of control surfaces adapted to be actuated directly by the aviator, and consisting of a steering rudder 2, a horizontal rudder 3, and a set of ailerons 4—4, and with a separate set of automatically operated auxiliary control surfaces consisting of a steering rudder 2', horizontal rudders 3'—3', and ailerons 4'—4'. Each auxiliary control surface is designed to exert on the airplane a smaller turning movement than the corresponding manually operated control surface, and accordingly I have illustrated each auxiliary control surface as of less area than the corresponding manually operated control surface, though, of course, the turning moment of any of the control surfaces may be varied by varying its effective lever arm rather than its area, as is shown by placing surfaces 4'—4' nearer the center line of the craft than surfaces 4—4.

Figure 1:
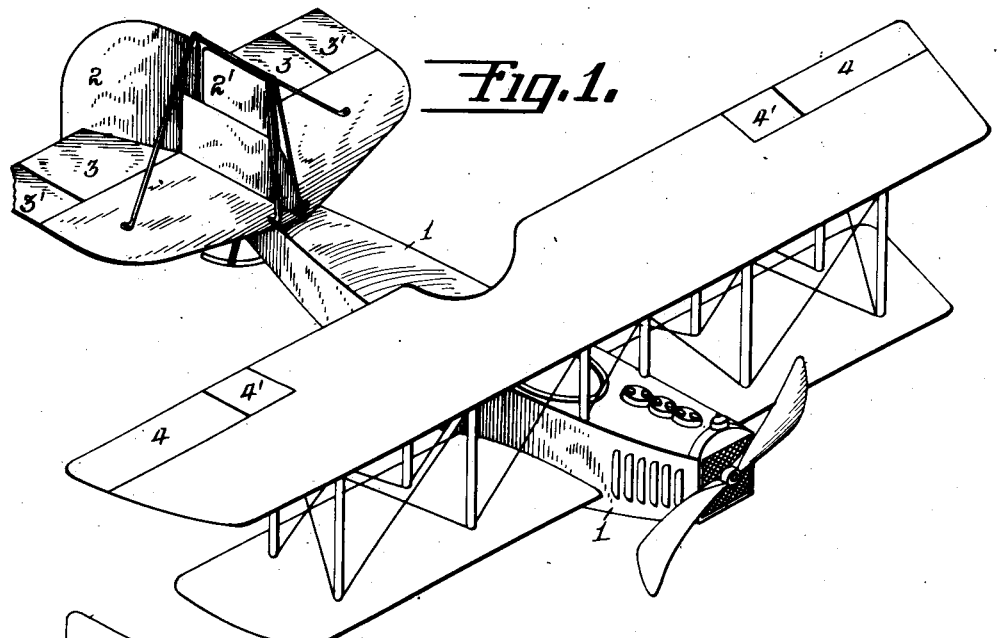
Fig. 1 is a perspective view of an airplane provided with a plurality of sets of rudders and stabilizing surfaces.
Figure 2:
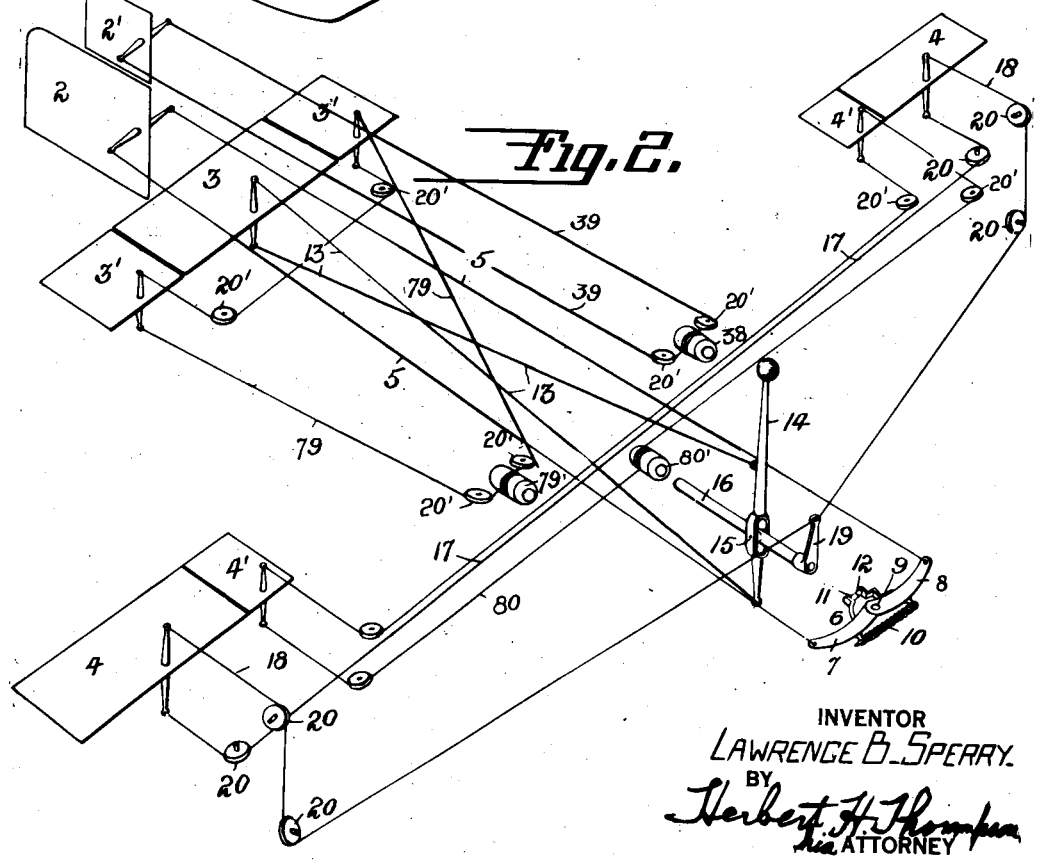
Fig. 2 is a diagrammatic view of one form of means for operating the sets of control surfaces.

Various means for enabling the aviator to actuate the control surfaces 2, 3, and 4 may be utilized. I have shown one such means by way of example in Fig. 2. While steering rudder 2 may be connected, as by wires 5, with any suitable lever, pedal, or the like, I have shown it connected to the extremities of a two part pedal 6, the parts 7, 8, which are pivoted together at 9 and connected by a spring 10 which normally holds parts 7 and 8 in such position that contacts 11 and 12, which are mounted on parts 7 and 8, respectively, are closed. Spring 10 is sufficiently powerful that rudder 2 may be operated by pressure on either of parts 7—8 of pedal 6 without separating contacts 11 and 12, but if sufficient force be applied to both parts 7 and 8 simultaneously, contacts 11 and 12 may be separated. The purpose of contacts 11 and 12 will appear later. Horizontal rudder 3 is shown connected by wires 13, 13 with control lever 14, pivoted at 15 to rockshaft 16.

For operating the ailerons 4, 4, a cable or wire 17 is shown directly connecting said ailerons, while a second cable or wire 18 is connected at its ends to both ailerons and at its center to an arm 19 projecting from rock-shaft 16. Suitable pulleys 20 may be provided for guiding wires 17 and 18, and pulleys 20' may be provided for guiding the wires controlling the auxiliary control surfaces.

For automatically controlling the auxiliary steering rudder 2' I may employ a gyroscope 21 of the type disclosed in my copending application No. 112,505 for gyroscopic pilot for aeroplanes, filed August 1, 1916. As there disclosed, the steering gyroscopic unit comprises a gyroscope mounted on a horizontal spinning axis and controlling the steering rudder thru a set of contacts 24 connected to the gyroscope mounting to which are connected wires 22 and 23. A contact brush 25 is pivotally mounted on a relatively fixed part of the airplane. Brush 25 can be moved with reference to gyroscopically controlled contacts 24 by means of a follow-up connection from the auxiliary steering rudder 2', which follow up connection consists of wires 41 leading from a drum 40 on a shaft 35 of a servo motor to be described later. As before stated, however, this follow-up connection may be omitted entirely, if desired, since the small automatic control surfaces cause a more gradual turning of the airplane than is caused by the usual automatic control surfaces of larger area, and the "hunting" of the airplane is to a great extent eliminated. When relative movement in azimuth takes place between the gyroscope and airplane a circuit is closed thru one or the other of wires 22—23 and hence thru one or the other of coils 26—27 of a servo motor 28, which servo motor is shown as comprising gears 29 and 30 continuously driven in opposite directions by a fan or windmill 31, on a shaft 32, by means of intermeshing pinions 33, 34. Mounted on shaft 35, and positioned between said gears 29 and 30, is a clutch disk 36 adapted to engage with clutch faces provided on said gears. As either coil 26—27 is energized, the corresponding gear will be thrown against disk 36, and shaft 35 will be revolved to actuate the auxiliary vertical steering rudder 2' through bevel gears 37—38 and wires 39.

The details of the preferred form of servo motor, for this and similar uses, are fully described in my copending application now matured into Patent No. 1,415,003 dated May 2, 1922, for automatic pilots for aeroplanes and consequently further detailed description of the servo motor will not be given here.

For automatically controlling both the longitudinal and lateral stability a gyroscope 42, of the type disclosed in my aforesaid Patent #1,415,003, may be used. As explained in said patent, the gyroscopic unit comprises a pendulous gyroscope mounted on a vertical spinning axis and controlling both the longitudinal and lateral controls by two sets of contacts 43—44 positioned so as to be moved by the relative movement of the gyroscope and airplane about either axis. Contacts 44, which, with the airplane flying in the direction of the arrow 45, would govern the longitudinal stability, are mounted on the horizontal gimbal ring 46, while contacts 43 are secured to a swinging loop 47 connected to the gyroscope so as to remain fixed with respect to the longitudinal axis.

As in the case with the steering gyroscope, the cooperating brushes may be provided with a follow up system if desired, although, a follow up system is not such a necessary element in this invention as in my former invention. For this purpose, arm 48, which supports brush 49, is pivotally mounted and secured to a pulley 50, around which the follow up wires 51 from the auxiliary horizontal rudders 3' extend. Likewise, brush 52 is connected to a pulley 53 over which follow up wires 54 are placed leading from the auxiliary ailerons 4'.

From the foregoing description it is evident that relative movement about a horizontal axis between the airplane and gyroscope will result in brush 49 engaging one of contacts 44, whereupon a circuit will be closed thru one or the other of coils 55, 56 of servo motor 57, with the result that the auxiliary horizontal rudders 3' will be moved thru gear 79' and wires 79 in one direction or the other. Likewise, relative movement about the longitudinal axis of the airplane between the airplane and gyroscope will result in the closing of a circuit through one or the other of coils 58—59 of servo motor 60, with the result that auxiliary ailerons 4' will be operated thru gear 80' and wires 80.

The windmill 31 may be used to generate both direct and alternating current, by communicating its rotation to a direct current generator and to a separate alternating current generator. I have shown the direct current generator diagrammatically at 61 as furnishing current for the coils of the servo-motors. The alternating current generator is shown diagrammatically at 62, and may have its field 63 excited from the direct current machine. The alternating current generator 62, as shown, is of the three phase type, the generator being an inductor alternator, while the gyro motors are three phase induction motors and are driven from said generator, the windings 64, 65, being placed on the stators of the corresponding gyroscopes 21 and 42.

The apparatus so far described would be satisfactory for temporary changes in the inclination or course of the machine but, for a permanent change, it would be advisable and even necessary to provide additional means to cause the automatic pilot to steer the machine on the new course when the manual control is released as otherwise the machine would be brought back to its original heading. A means for this purpose may be provided about each control axis, but as a permanent change of course is only effected in azimuth, I have shown such means as applied to the vertical rudder 2 only.

One of the simplest methods of altering the automatic control in azimuth is to lock the control gyroscope 21 to the machine when it is desired to alter the course and to release it again when the machine is headed in the new desired direction, as disclosed and claimed broadly in my aforesaid co-pending application for gyroscopic pilot for airplanes, Serial No. 112,505, filed August 1, 1916. For this purpose, I have provided means acting automatically, whenever the aviator actuates pedal 6, with sufficient force, for centralizing and locking the gyroscope with relation to the airplane, so that, after the gyroscope is unlocked no circuit will be closed thru either coil of the servo motor 28 as long as the airplane keeps on its new course in azimuth.

Figure 4:
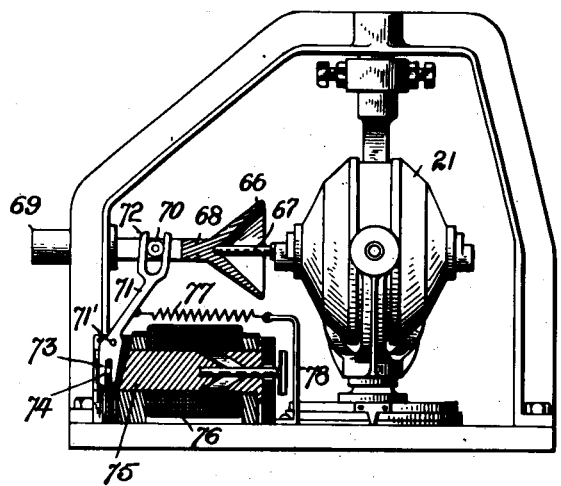
Fig. 4 is a view in elevation, partly in section, of a means for automatically locking the steering gyroscope when the operator actuates the control means for the steering rudder.

I have shown in detail in Fig. 4, a tapering or conical shaped member 66, which is adapted to be moved toward the gyroscope to engage a stem 67 extending therefrom. Member 66 is provided with a rearwardly projecting stem 68 slidable in a bearing 69 and carrying a pin 70. A lever 71 is pivoted at 71' and has a forked end 72 which engages pin 70 and a forked end 73 which engages pin 74 on the movable core 75 of solenoid 76. When said solenoid is energized the member 66 is retracted and the gyroscope 21 is unlocked with respect to the airplane. When, however, said solenoid is deenergized, a spring 77, attached at one end to lever 71, and at its other end to a bracket 78, moves member 66 into position for locking the gyroscope with respect to the airplane, so that no current will flow thru contacts 24 and 25.

Figure 3:
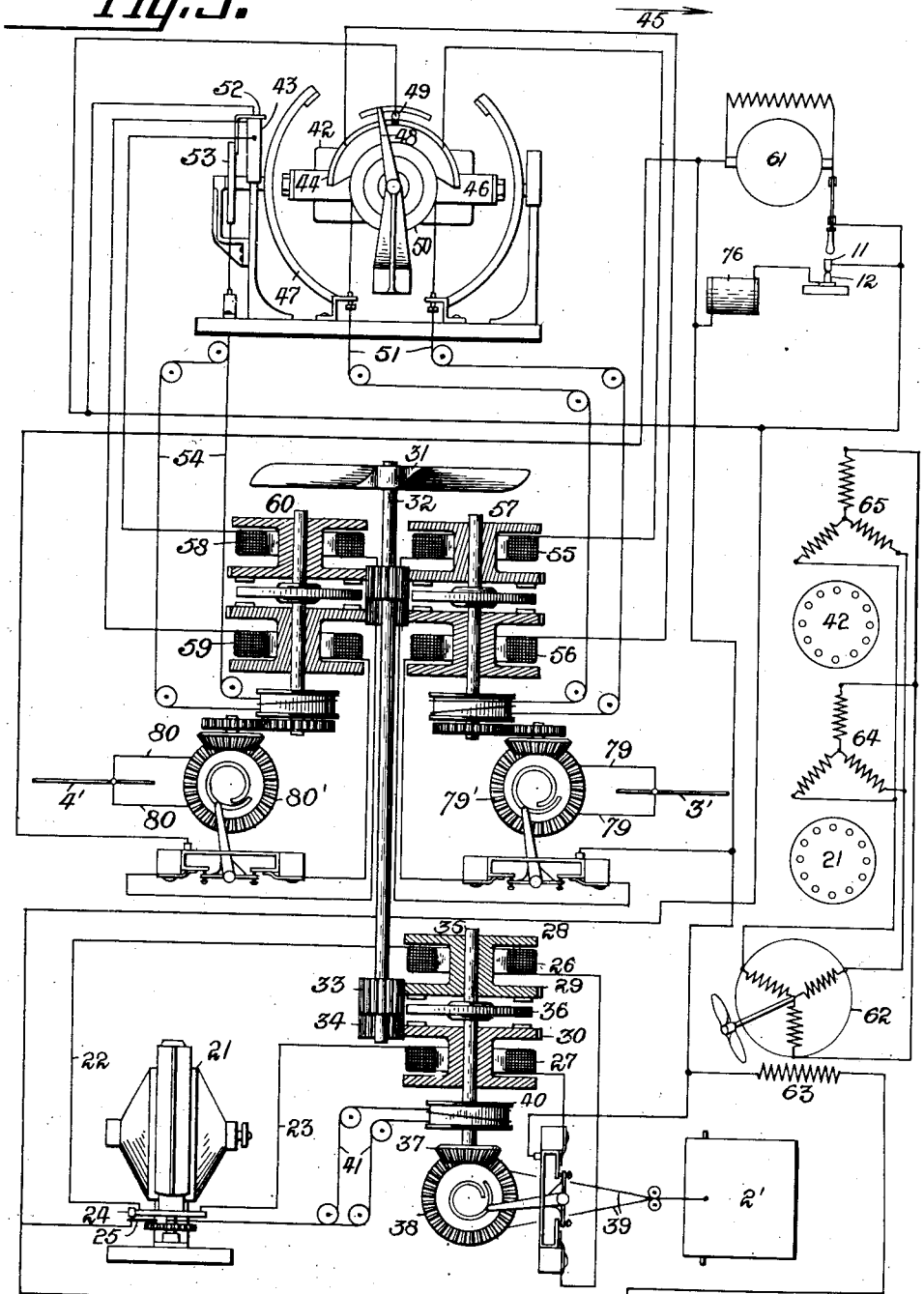
Fig. 3 is a diagrammatic view of an automatic control means.

While solenoid 76 might be energized from an independent circuit, I have shown it, in Fig. 3, connected to the direct current generator 61. In series with said solenoid are contacts 11 and 12. Ordinarily, when rudder 2 is operated by actuation of either part 7 or 8 of pedal 6, said contacts remain closed, due to the strength of spring 10, but if it is desired to deenergize solenoid 76, the aviator may actuate both parts 7 and 8 of pedal 6 simultaneously, thus compressing spring 10 sufficiently to separate contacts 11 and 12 and turn the rudder while the contacts are open. Wires 5—5 should of course be sufficiently flexible or have sufficient slack to permit both parts of pedal 6 to be actuated simultaneously. The circuit thru solenoid 76 is thus broken, and spring 77 moves tapered member 66 into position to centralize and lock the gyroscope 21, whereas, when said parts 7—8 are released, spring 10 closes contacts 11 and 12 and the solenoid 76 causes the retraction of tapered member 66, whereby the gyroscope is automatically unlocked, after the airplane has been brought to its new heading.

The operation of my device is apparent from the above description. The operator may cause any desired movements of the airplane by operating control surfaces 2, 3 and 4 regardless of the action of the automatic control surfaces. After actuation of members 2, 3 and 4 has ceased, the automatic control stabilizes the airplane longitudinally and laterally and returns it to its original course in azimuth unless the operator has previously caused contacts 11 and 12 to separate, in which case the airpane will continue in azimuth on the course resulting from actuation of rudder 2 while the contacts were separated.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Thus it will be understood that manual control devices, by which the plane is controlled at will, are illustrative only and that my invention is adapted to aircraft having any form of control whether it be directly from the operator in the plane or otherwise. Also, while it is designed to use the various features and elements in the combination and relations described, some of these may be altered and others omitted without interfering with the general results outlined, and the invention extends to such use.

Having described my invention, what I claim as new and desire to secure by Letters Patent is:

1. In an airplane control system, the combination with the usual manually operable control surface or surfaces for turning the airplane up or down, of a separate control surface or surfaces for performing the same function of less turning effect than the first mentioned control surfaces, and means brought into action when the airplane turns up or down for operating the separate control surfaces automatically.

2. In an airplane control system, automatic means for controlling all movements of the airplane about both horizontal axes, and separate controllable at will means of greater turning effect than said automatic means for controlling the movements of the airplane about the said axes, whereby said automatic means may be overcontrolled at the will of the operator.

3. In an airplane control system, means responsive to movements of the airplane about a lateral axis for controlling the movements of the airplane about said axis, and separate means operable simultaneously with and independently of the first mentioned means, for controlling the movements of the airplane about the same axis, said separate means having a greater turning effect than said first mentioned means.

4. In a control system for airplanes, a plurality of independently operable control surfaces for governing the movements of the airplane about the same axis, means for controlling one of said surfaces, automatic means for controlling another of said surfaces, and means controllable by operating the first named means for rendering said automatic means inoperative.

5. In a control system for airplanes, a plurality of control surfaces, controllable means for operating one surface, automatic means for operating another surface, means for normally maintaining said automatic means operative during the operation of said controllable means, and means cooperating with said controllable means for rendering said automatic means inoperative during the operation of said controllable means.

6. In an aircraft control system, a plurality of control surfaces for governing the movements of the aircraft about a plurality of axes, means responsive to turning of the craft about each of the several axes for controlling the surfaces for governing the craft about said axes, and a separate set of manually operable control surfaces of greater turning effect than the first mentioned control surfaces for modifying the effect of the latter surfaces at the will of the aviator.

7. In a control system for aircraft, a plurality of control surfaces adapted to control the aircraft about the same axis, means for controlling one surface, means including a gyroscope for controlling another surface, and means associated with the first mentioned means for rendering the second mentioned means inoperative at will.

8. In a control system for aircraft, a plurality of control surfaces, means for controlling one surface, means including a gyroscope for controlling another surface, and means associated with the first mentioned means for locking the gyroscope to the aircraft.

9. In a control system for aircraft, a plurality of control surfaces, means for controlling one surface, means including a gyroscope for controlling another surface, and means associated with the first mentioned means for centralizing the gyroscope with respect to the aircraft.

10. In a control system for aircraft, a plurality of control surfaces, means for controlling one surface, means including a gyroscope for controlling another surface, and means associated with the first mentioned means for centralizing and locking said gyroscope with respect to the aircraft.

11. In combination with an aircraft, means for controlling the same about a plurality of axes, means adapted to automatically maintain a position fixed with respect to space for governing said controlling means, additional means for controlling said craft about said axes and adapted to overcome said first named controlling means and means operable at will for governing said additional means.

12. In combination with an aircraft, a steering rudder therefor, an automatic pilot device for controlling said rudder, an additional steering rudder of greater turning effect for said craft, means operable at will for controlling said additional rudder and means selectively operable from said first-named means for altering the relationship between said device and the aircraft.

13. In combination with an aircraft, means for controlling the stability of said craft, means adapted to maintain a plane fixed in space adapted to govern said controlling means, additional means for controlling the stability of said craft and having greater effect than said first named means, and manually operable means for governing said additional means.

14. In combination with an aircraft, a gyroscopic controlling device, a rudder controlled therefrom adapted to steer the craft in a predetermined direction in azimuth, means operable at will, a rudder actuated thereby having a greater controlling effect on the airplane than said first named rudder, and means for locking said gyroscope when said second rudder is turned whereby the direction in which the gyroscopic device steers the craft may be altered.

15. In combination with an aircraft, a gyroscopic controlling device, a rudder controlled therefrom, adapted to steer the craft in azimuth, other controlling means operable at will, a rudder actuated thereby having a greater controlling effect on the airplane than said first-named rudder, and means selectively brought into action by the operation of said first-named means for locking said gyroscope for altering the course.

16. In an automatic pilot for dirigible craft, automatic means for maintaining a predetermined straight course, means operable at will for temporarily changing the course without disturbing said automatic means, whereby, upon release of said second means, the craft automatically resumes its original course, and means also operable at will for permanently altering the course, including means for operating on said automatic means.

17. In an automatic pilot for dirigible craft, automatic means for maintaining a predetermined straight course, means operable at will for temporarily changing the course without disturbing said automatic means, whereby, upon release of said second means, the craft automatically resumes its original course, and means selectively operable from said second named means for permanently altering the course, including means for temporarily rendering said automatic means inoperative.

In testimony whereof I have affixed my signature.

LAWRENCE B. SPERRY.